(12) United States Patent
Knight et al.

(10) Patent No.: US 6,178,464 B1
(45) Date of Patent: *Jan. 23, 2001

(54) SYSTEM AND METHOD FOR CANCELING A COMPUTER REQUEST

(75) Inventors: Holly Knight, La Honda; Don Banks, San Jose, both of CA (US)

(73) Assignee: Apple Computer, Inc., Cupertino, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/644,259

(22) Filed: May 10, 1996

(51) Int. Cl.[7] .................................................. G06F 9/40
(52) U.S. Cl. ........................................... 709/328; 709/313
(58) Field of Search .................................... 395/680, 682, 395/670, 671, 672; 709/310, 328, 101, 102, 313

(56) References Cited

U.S. PATENT DOCUMENTS

| | | | | |
|---|---|---|---|---|
| 4,503,499 | * | 3/1985 | Mason et al. | 364/200 |
| 4,905,181 | * | 2/1990 | Gregory | 364/900 |
| 5,187,787 | * | 2/1993 | Skeen et al. | 395/650 |
| 5,278,984 | * | 1/1994 | Batchelor | 395/650 |
| 5,404,523 | * | 4/1995 | DellaFera et al. | 395/650 |
| 5,432,933 | * | 7/1995 | Janicek | 395/650 |
| 5,448,730 | * | 9/1995 | Bakita et al. | 395/650 |
| 5,544,318 | * | 8/1996 | Schmitz et al. | 395/200.04 |
| 5,630,133 | * | 5/1997 | Hotea et al. | 395/671 |
| 5,659,747 | * | 8/1997 | Nakajima | 395/651 |
| 5,787,019 | * | 7/1998 | Knight et al. | 364/550 |
| 5,838,969 | * | 11/1998 | Jacklin et al. | 395/680 |
| 5,915,131 | * | 6/1999 | Knight et al. | 395/692 |

OTHER PUBLICATIONS

Copland Technical Overview, Preliminary Draft, Apple Computer, Confidential May 5, 1995.
D. R. Jefferson, "Virtual Time", ACM Trans. Prog. Lang., pp. 403–424, 1985.*

* cited by examiner

Primary Examiner—Majid Banankhah
Assistant Examiner—Sue Lao
(74) Attorney, Agent, or Firm—Carr & Ferrell, LLP

(57) ABSTRACT

A program routine generates Requests for a target system, such as a physical device or program code, to perform a service. Each Request includes identification information, and passes through intermediate layers, including a family program interface and a Family Server, for processing before it reaches the target system. The program routine also generates Cancels, which include the appropriate identification information, and sends the Cancels after the Requests. Each Cancel tracks its Request, and upon finding the Request, attempts to cancel it. A Cancel may find a Request before the Request has been forwarded to a target system, while it is being processed by the target system, after it has been executed by the target system, or may not find it. Results of the Requests and of the Cancels are returned through the intermediate layers to the program routine.

30 Claims, 6 Drawing Sheets

SYSTEM AND METHOD FOR CANCELING A COMPUTER REQUEST

CROSS-REFERENCE TO RELATED APPLICATIONS

This application is related to co-pending patent application Ser. No. 08/644,704, filed on May 10, 1996, entitled "System and Method for Collecting and Dispatching Selected Events in a Computer," by inventors Kelly Jacklin and Daniel Clifford, and patent application Ser. No. 08/644,255, filed on May 10, 1996, entitled "System and Method for Handling Dynamic Changes in Device States," by inventors Holly Knight et. al., the subject matter of which is hereby incorporated by reference. These related applications are commonly assigned to Apple Computer.

BACKGROUND OF THE INVENTION

1. Field of the Invention

This invention relates generally to computer systems, and more particularly to canceling service Requests in computer systems.

2. Description of the Background Art

Program routines, such as application program routines or operating system routines, request computer processing of services, such as file management, block storage management, print commands, keyboard inputs, establishing a connection, changing power mode, etc., by generating a "Request" and associated information. The Request and associated information are delivered to a performing target system, which may be a physical device such as a printer or hard drive, or may be a logical device such as another program routine. The Request is a message containing a command such as a "read" or a "write." For example, a user may select a "Save" choice from a pull-down menu in a word processing program to request storage of a text document on a hard drive. Accordingly, a word processor program routine generates a "write" Request, and delivers the Request and associated information to the hard drive, which as instructed stores the data.

For various reasons such as cancellation by a user, expiration of a time limit or system termination of a particular task, a particular program routine may seek to cancel a previously-issued Request. For example, a user may become tired of waiting for a Request, such as a "print," to complete, or may decide that making the Request was a mistake.

Previous programs include specific routines for recognizing cancellation initiation sequences, and specific routines for implementing the Cancels. For example, some word processing programs recognize a "command-period" or a mouse-down operation while the cursor is over a field labeled "Cancel" or "Stop" as a user cancellation Request. However, requiring each program to include specific routines to monitor for cancellation initialization sequences and to perform cancellation is inefficient.

Previous programs are also limited to canceling only specific Requests such as "print." For a first example, if a user requests a system to store a file onto a floppy disk, the system reads the file data, sends the data to a Small Computer System Interface (SCSI) port, and writes the data to the floppy disk. However, to cancel this file storage Request, the user must know the specific implementation underlying the system so that the user can "find" and accordingly delete the Request. Otherwise, the Request cannot be stopped. For a second example, many users have experienced a computer which has become "caught in a loop" while attempting to process a Request such as "Save." Without means to issue a specific Cancel, only quitting the application program or rebooting the system will free the computer.

Further, previous cancellation systems do not report the actual results of the Request to the originating program routine. For example, if a word processor user terminates a print Request, but several pages are printed nonetheless, the word processor and the user remain unaware of the printed pages. To the application and to the user, the job was canceled and no results were obtained.

Therefore, a system and method are needed to provide a system-wide cancellation function. Further, a system and method are needed that enable communication with a target system, and intermediate layers, for canceling Requests which are currently being processed. Still further, a system and method are needed that provide the actual status of previously-issued Requests back to the originating program routine.

SUMMARY OF THE INVENTION

The present invention overcomes limitations and deficiencies of previous systems by providing a system and method for canceling a Request. The system includes a central processing unit (CPU) connected to a memory. The memory stores a program which, when executed, generates Requests for services such as print, write, read or the like, and which sometimes generates Cancels. The cancellation system utilizes an Application Program Interface (API) referred to as a Family Program Interface (FPI) for communicating with a Family Server. The FPI translates Requests and Cancels for the Family Server. The Family Server, which includes program code to perform a set of services, processes the Requests and processes the Cancels. The Family Server stores sufficient contextual information concerning each Request and concerning each Cancel in context data structures to allow the server to relate a particular Request to a Cancel. The Family Server communicates the Request via a plugin to the target system for performance of the Request.

The present invention also provides a cancellation method which includes the steps of having a program routine issue a Request and subsequently issue a Cancel. The Cancel chases the Request through the FPI to the Family Server. If the Cancel reaches the Family Server before the Request is forwarded to the target system, the Family Server deletes the contextual information on the Request from the context data structures, repossesses any resources allocated for the Request, and returns a "Cancel Succeeds" status response back to the originating program routine. If the Cancel reaches the Family Server while the target system is performing the Request, the Family Server attempts to cancel the target system operations by forwarding the Cancel to the target system if it supports cancellation. Accordingly, the target system operations are canceled and a "Cancel Succeeds" status response is returned to the originating program routine. If the target system does not support cancellation, the Family Server must wait until the target system completes its operations. Upon completion of the Request, a response to the Cancel and a response to the Request are returned to the originating program routine. If the Cancel is transactional, the actual results of the target system operation and a "Cancel Fails" response are both sent back to the originating program routine. Otherwise, if the Cancel is non-transactional, the results may be discarded at this time, and a "Cancel Succeeds" response may be sent to the originating program routine. Although the present invention has been described with reference to families, any asynchronous system having a predetermined hierarchy can alternatively be used.

DETAILED DESCRIPTION OF THE PREFERRED EMBODIMENT

Figure 1:
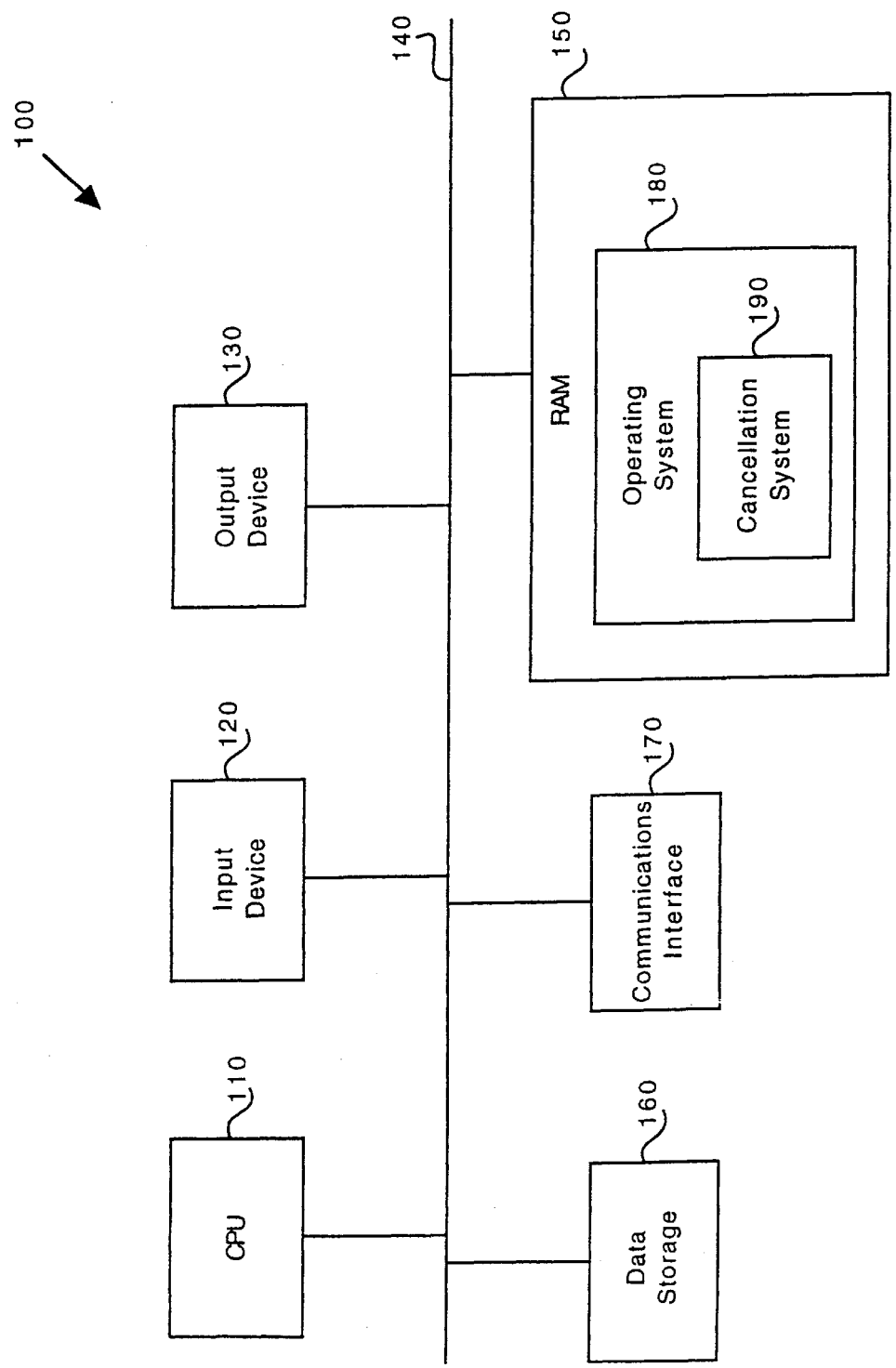
FIG. 1 is a block diagram of a computer system including a cancellation system in accordance with the present invention.

FIG. 1 is a block diagram of a computer system 100 including a Central Processing Unit (CPU) 110 based on a computer such as a Power Macintosh manufactured by Apple Computer, Inc. of Cupertino, Calif. Computer system 100 comprises an input device 120 such as a keyboard and mouse, an output device 130 such as a Cathode Ray Tube (CRT) display, Random Access Memory (RAM) 150, data storage 160 including Read Only Memory (ROM) and a hard disk drive, and a communications interface 170, each coupled via a signal bus 140 to CPU 110.

An operating system 180 is a program that controls processing by CPU 110, and is typically stored in data storage 160 and loaded into RAM 150 for execution by CPU 110. CPU 110 has access to RAM 150 for storing intermediate results and miscellaneous data. Operating system 180 includes a cancellation system 190, which is a program that cancels previously-issued service Requests.

Figure 2:
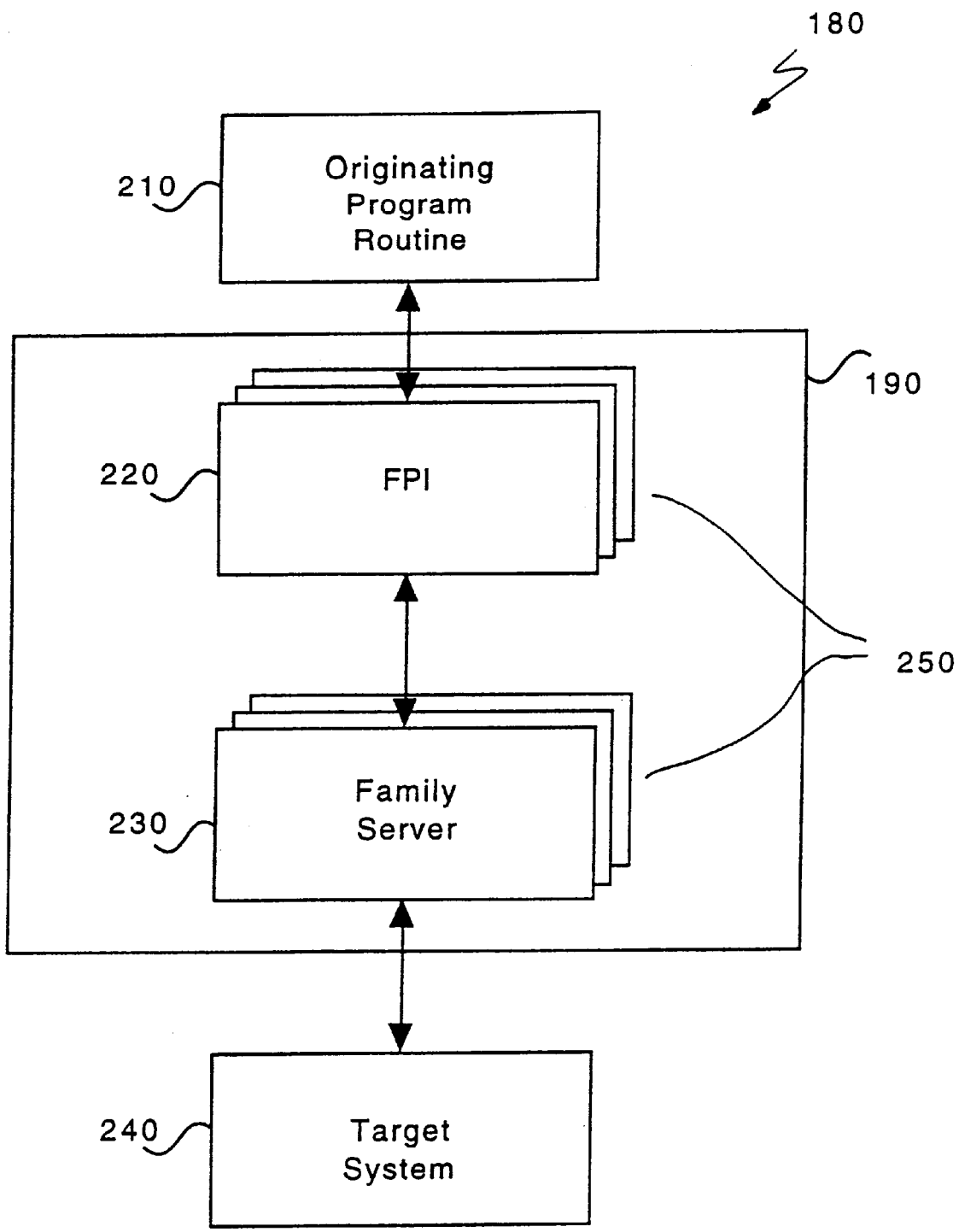
FIG. 2 is a block diagram of the FIG. 1 cancellation system.

FIG. 2 is a block diagram of cancellation system 190 including Family Program Interfaces (FPIs) 220 and Family Servers 230 as intermediate layers 250, used in conjunction with an originating program routine 210 and a target system 240. Routine 210 may be a word processor, graphics program, operating system or any other program capable of requesting a family service such as a print, a write, a read or the like. Target system 240 may be a physical device such as a disk, a printer, RAM 150 or a communications interface 170, or may be a logical device such as another program routine 210. Requests are transferred in the form of message packets from program routine 210 through intermediate layers 250, including at least one FPI 220 and at least one Family Server 230, to a target system 240.

Program routine 210 generates a Request for directing a target system 240 such as a hard drive to perform a particular task such as store a word processing document. Program routine 210 generates either a "synchronous Request" wherein the program routine operations are suspended until a response to the Request is received, or generates an "asynchronous Request" wherein the program routine may continue performing other tasks in parallel while a response is being generated "below," i.e. generated by those components illustrated in FIG. 2 under routine 210. Independent of whether the requesting program 210 makes asynchronous or synchronous Requests, the Family Server 230 may operate in an asynchronous mode or in a synchronous mode.

So that a Request can later be identified, program routine 210 maintains Identification (ID) information which uniquely identifies each Request. The ID information may be a Request ID specifying the particular Request, a connection ID specifying the connection through which the Request will pass, or a task ID specifying the task to be performed. For a connection ID or task ID to be useful, program routine 210 must have issued only one Request, otherwise the "lower" layer 250 would not know which Request to cancel. "Upper" and "lower" describe the relationship between two layers 250 illustrated in FIG. 2 and FIG. 3. Thus, connection IDs and task IDs function only when program routine 210 issues a synchronous Request.

Program routine 210 forwards the Request through FPI 220 to Family Server 230. FPI 220 is a program interface which enables communication between program routine 210 and Family Server 230. FPI 220 is also responsible for generating the Request ID information, and transmitting the ID information to routine 210. Family Server 230 includes program code for providing a set of services such as file management, block storage management, Small Computer System Interface (SCSI) control or keyboard control, to program routine 210. There is a respective FPI 220 and Family Server 230 for each set of services. Family Server 230 provides the execution environment and services necessary for transferring Requests to and from target system 240.

For various reasons, such as cancellation by a user, expiration of a time limit or system termination of a particular task, program routine 210 may attempt to cancel a previously-issued Request. Program routine 210 sends the Cancel message through FPI 220 to Family Server 230, in search of the original Request. Program routine 210 maintains contextual information that the Cancel message was sent. One reason for maintaining this information is to handle the case where, before the Cancel message reaches the Request, the results of the completed Request are returned to routine 210. This allows routine 210 to clean up the now outstanding Cancel.

Family Server 230 attempts to determine the location of the Request. If Family Server 230 has not forwarded the Request to target system 240, then Family Server 230 attempts to cancel the Request at this layer 250. If Family Server 230 has forwarded the Request to target system 240, then Family Server 230 maintains Cancel information and sends the Cancel message to target system 240. If target system 240 supports cancellation, then the target system will cancel its operations. Otherwise, target system 240 completes its operations oblivious of the Cancel message, and Family Server 230 waits to receive the results from target system 240. Whether successful or not, a Request status response and a Cancel status response are delivered through layers 250 back to program routine 210.

Figure 3:
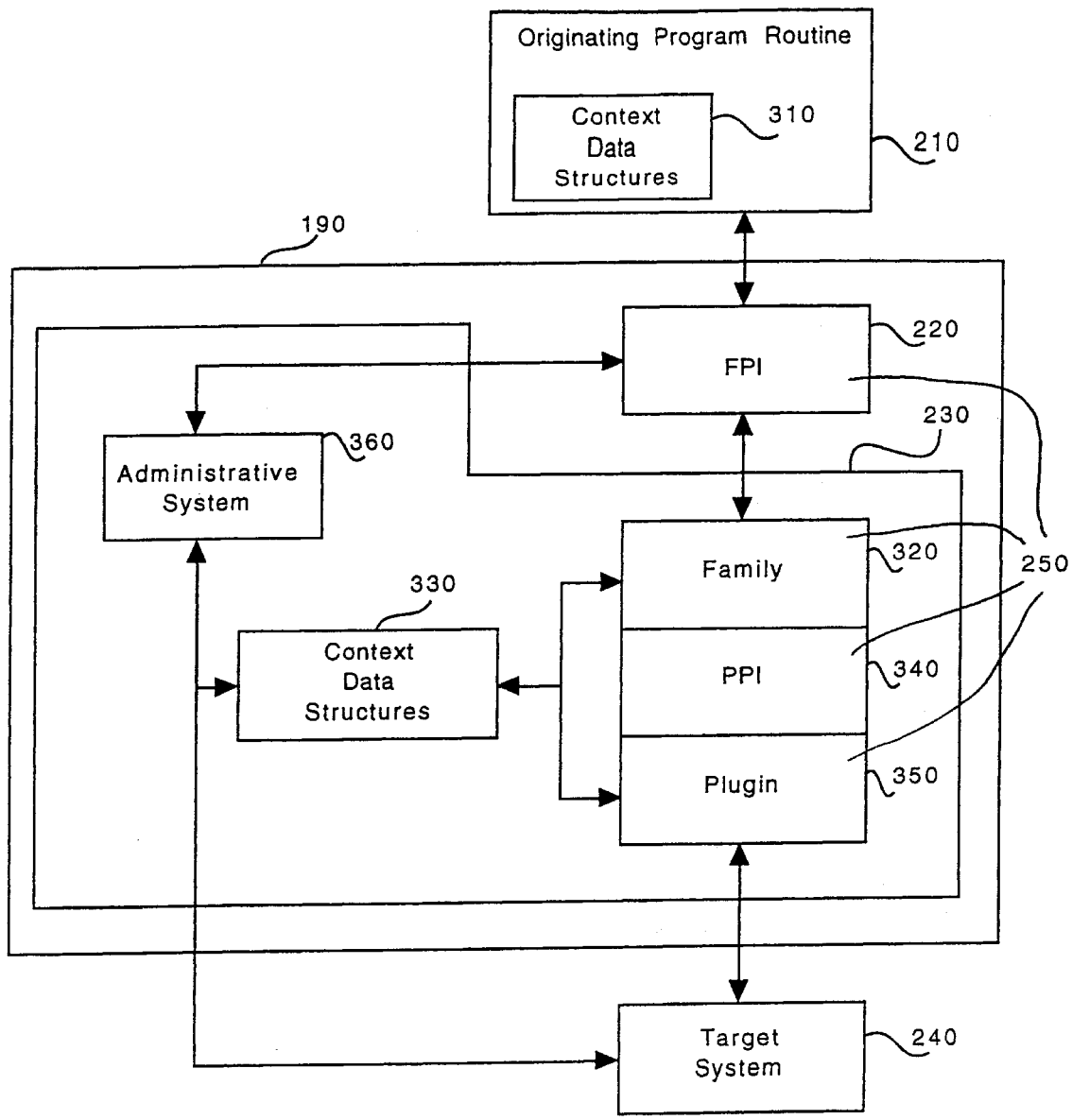
FIG. 3 is a block diagram further illustrating the FIG. 2 Family Server.

FIG. 3 is a block diagram further illustrating Family Server 230. Program routine 210 includes context data structures 310; and Family Server 230 includes a family 320, context data structures 330, Plugin Program Interface (PPI) 340, a plugin 350 and an administrative system 360.

When issuing a service Request, program routine 210 sends a Request message through FPI 220 to family 320, which includes the program code for controlling the family services. The FPI 220 generates ID information, such as a Request ID or a connection ID, and returns the information to program routine 210. Routine 210 then adds this ID information, and possibly other contextual information, to context data structures 310. Family 320 recognizes the Request, and adds contextual information to context data structures 330 to "remember" the Request. Family 320 may generate new ID information associated with the original ID information for the new Request, and may replace the original ID with the new ID in the Request. For example, if a family 320 generates multiple new Requests based on an original Request, each new Request may be assigned a new Request ID associated with the original Request ID.

Family 320 processes the Request and passes it through PPI 340, which translates Requests for plugin 350, to plugin 350. Plugin 350 is program code that enables Family Server 320 to communicate with a target system 240 for providing its services, and may be a device driver or a support routine for controlling target system 240. Plugin 350 adds its contextual information to "remember" the Request in context data structures 330, or alternatively in other dedicated data structures. Plugin 350 then sends the Request to target system 240.

If a "lower" layer 250 cannot handle Requests at a particular time, the "upper" layer 250 waits to forward the Request. For example, while family 320 (upper layer) waits for plugin 350 (lower layer), the family stores contextual information, indicating that the Request remains with the family, in context data structures 330. When Plugin 350 can accept a Request, family 320 processes the Request and passes it through PPI 340 to plugin 350.

To cancel a Request, program routine 210 uses the contextual information in context data structures 310 to generate and send a Cancel message after the Request. Although program routine 210 is described as generating the Cancel, various other sources such as other layers 250 or other program routines can originate Cancel messages. Program routine 210 reads the contextual information on the Request contained in context data structures 310 to determine ID information, and generates a Cancel message. Routine 210 sends the Cancel message through FPI 220 to administrative system 360.

Administrative system is a control manager task executing on a separate thread of family server 230 for handling all administrative Requests, such as Cancels, at a "higher priority," and is coupled to FPI 220, context data structures 330 and target system 240. Administrative system 360 enables the "simultaneous" processing of a Cancel message and of other work being performed by the Family Server. Even if Family 320 or Plugin 350 is blocked, administrative system 360 can process the Cancel.

Administrative system 360 reads the contextual information included in context data structures 330 to determine the location of the Request, i.e. whether the Request has been forwarded to plugin 350 or forwarded to target system 240. If the Request remains with family 320 or plugin 350, administrative system 360 cancels the Request from context data structures 330, and cleans up the contextual information on the Request.

If the message has been forwarded, administrative system 360 adds to context data structures 330 contextual information including a Cancel tag to inform family 320 that the Request is "to be canceled." Since the administrative system 360 processes the Cancel asynchronously and at high priority, a Cancel message may reach a particular layer 250 ahead of the Request. Accordingly, maintaining contextual information on the Cancel enables canceling the Request when the Request finally does arrive at the layer. Administrative system 360 then attempts to cancel target system 240 operations. If target system 240 supports cancellation, then target system 240 attempts to cancel the identified operation in progress. Otherwise, target system 240 is allowed to complete the Requested operation.

Based on the type of Cancel, the layer 250 where the Cancel reaches the Request generates a Request status response and a Cancel status response. If the Cancel is non-transactional, i.e. where the actual target system actions are deemed immaterial, the results of target system 240 operations may be discarded at this time and a "Cancel Succeeds" response propagates back to program routine 210. Otherwise, if the Cancel is transactional, i.e. where the actual target system actions are deemed important, the results of any target system 240 operations and a "Cancel Fails" response are returned to program routine 210.

Each layer 250 propagates the responses upward through the above layers back to program routine 210. As each layer 250 receives the Request status response, the layer deletes or "cleans up" its contextual information from context data structures 330, and frees all resources allocated for the Request. Further, as the Cancel status response propagates upward, each layer 250 cleans up the contextual information on the Cancel from context data structures 330.

Occasionally, an upper layer 250 may forward a Cancel to a lower layer 250 at the same time that the lower layer 250 forwards the result of a completed Request back to the upper layer 250. To handle such a case, each layer 250 which receives a Request status response and which determines that the Request was to be canceled, sends a "Cancel Chase" to the lower layer 250. The Cancel Chase is preferably a one-way Request, which initiates "clean-up" of the Cancel message. As an optimization, if the lower layer 250 sees the Cancel response before it sees the Request response, no Cancel Chase is necessary.

Figure 4:
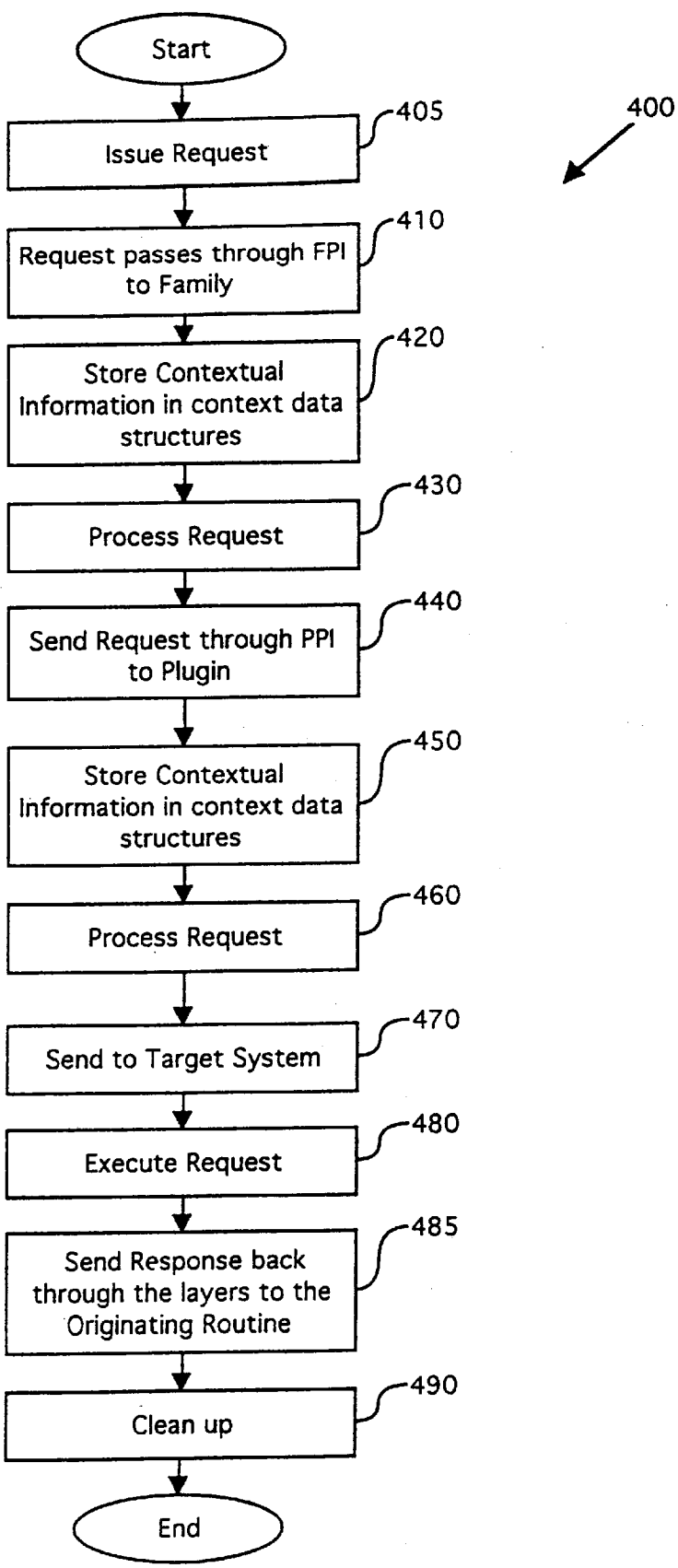
FIG. 4 is a flowchart illustrating a method for issuing a Request.

FIG. 4 is a flowchart illustrating steps of a method 400 for performing a Request using a cancellation system 190 in accordance with the present invention. Method 400 begins in step 405 by program routine 210 issuing a Request for a service such as file management service or print service. Issuing a Request causes an FPI 220 to assign appropriate ID information, such as a Request ID, to the Request and causes program routine 210 to add the ID information to context data structures 310.

Program routine 210 in step 410 passes the Request through FPI 220 to the respective family 320. Each family 320 includes the program code for performing one of the sets of services such as file management, block storage management, SCSI control, etc. Family 320 in step 420 adds contextual information such as the ID information on the Request in context data structures 330, and in step 430 processes the Request, which includes retrieving information needed by target system 240 to perform the Request. Family 320 in step 440 sends the Request through PPI 340 to plugin 350, which provides an interface to target system 240 used by family 320 to provide its services. Plugin 350 in step 450 adds contextual information in context data structures 330, and in step 460 processes the Request by gathering the information retrieved by family 320 for target system 240. Plugin 350 in step 470 sends the Request and gathered information to target system 240, which in step 480 executes the Request.

Upon completion of the Request, target system 240 in step 485 generates status information and sends the results and the status information to plugin 350. In step 490, plugin 350 cleans up its contextual information in context data structures 330, frees the resources allocated for the Request, and forwards the results and the status information through PPI 340 back to family 320. Family 320 cleans up its contextual information from context data structures 330, frees the allocated resources, and sends the results and status information through FPI 220 back to program routine 210. Program routine 210 cleans up its contextual information on the Request from context data structures 310, and frees its allocated resources. Method 400 then ends.

Figure 5:
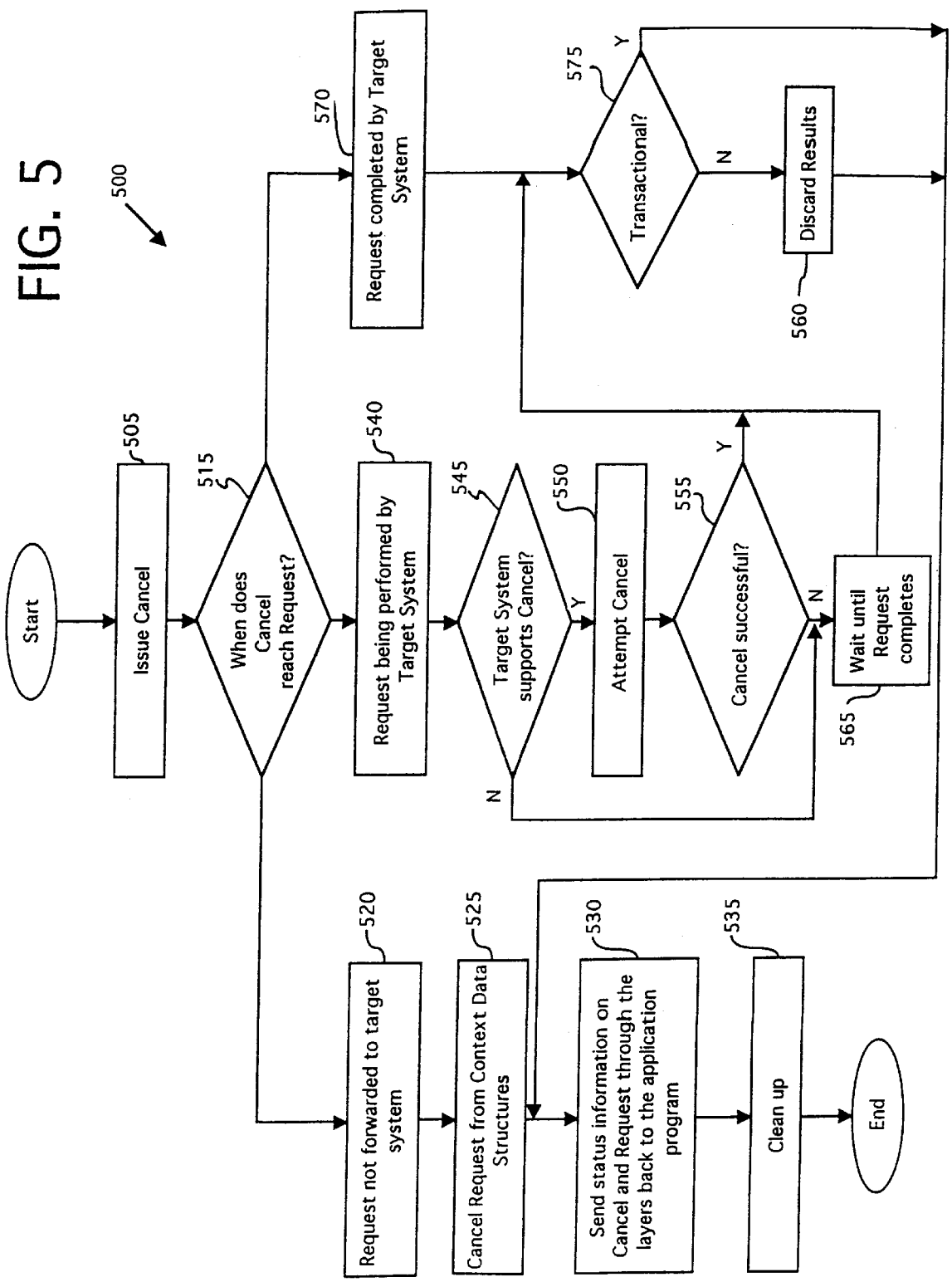
FIG. 5 is a flowchart illustrating a method for canceling a previously-issued Request.

FIG. 5 is a flowchart illustrating a method 500 of canceling a previously-issued Request. Method 500 operates as an asynchronous task, i.e. separate from and parallel to method 400. Method 500 begins in step 505 by program routine 210 issuing a Cancel message, which includes the ID information on the Request to be canceled, and sending the Cancel message via FPI 220 to administrative system 360 for chasing the Request message.

As illustrated in step 515, cancellation of a Request depends on when and where the Cancel catches up with the Request. If administrative system 360 reaches the request before it is forwarded to target system 240, then following path 520 administrative system 360 in step 525 cancels the Request from context data structures 330. Accordingly, the layer 250 where the Cancel reached the Request generates in step 530 a status response on the Request and a status response on the Cancel, and sends the status responses "upward" back through the layers to program routine 210. As each status response reaches a particular layer 250, the layer in step 535 deletes the contextual information on the Request and on the Cancel from data structures 330. When the responses reach program routine 210, the program routine deletes the contextual information on the Request and on the Cancel from context data structures 310. Method 500 then ends.

Alternatively, if in step 515 target system 240 is currently executing the Request, then the Cancel message proceeds on path 540. If target system 240 in step 545 supports cancellation, target system 240 in step 550 attempts to cancel the Request. If in step 555 the Cancel is unsuccessful or if in step 545 target system 240 does not support cancellation, then in step 565 the Cancel waits until target system 240 completes the Request, and method 500 proceeds to step 575 described below.

If the Cancel tested in step 515 does not reach target system 240 until target system 240 has completed the Request so that method 500 follows path 570, or if the Cancel in step 555 was successful or the Cancel waited in step 565 for target system 240 to complete the Request as described above, then method 500 proceeds to step 575 of determining whether program routine 210 issued the Request as transactional or non-transactional. If transactional, program routine 210 requires that an exact status of the Request and of the Cancel be reported back to program routine 210. For example, if target system 240 completes the Request despite the attempted Cancel, the process results are not discarded. Instead, the target system 240 results and a "Cancel Fails" response are reported to program routine 210. If target system 240 has completed only a portion of the Request before a Cancel succeeds in terminating operations of target system 240, then the intermediate results and a "Cancel succeeds" response are reported to program routine 210. However, if non-transactional, the results are discarded and a "Cancel Succeeds" response is reported to program routine 210. In either case, method 500 then proceeds to step 530, and continues as described above.

Figure 6:
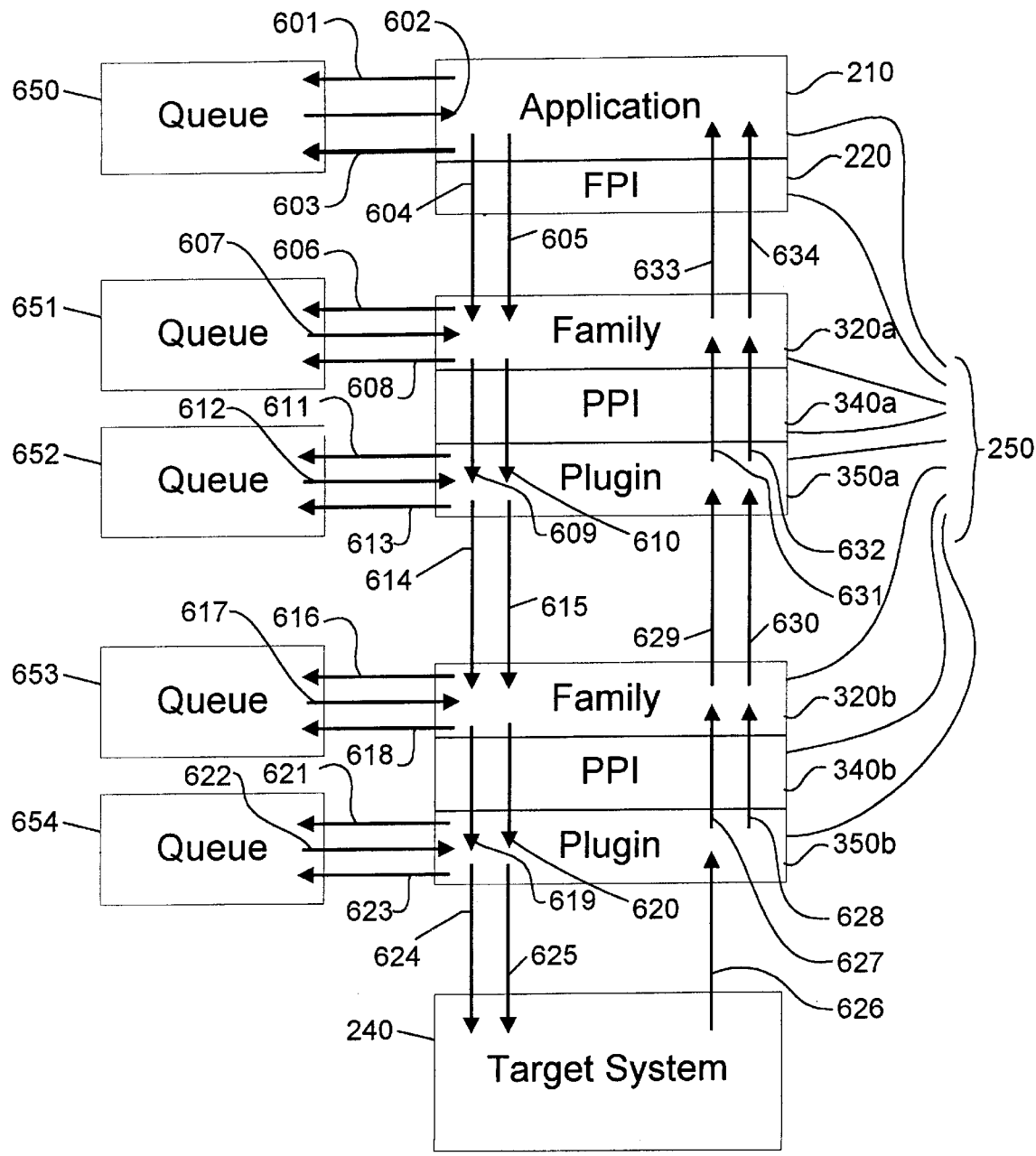
FIG. 6 is a block diagram of an example flow of a Request and of a Cancel.

FIG. 6 shows an example of a Request message flow and a Cancel message flow through layers 250 to and from target system 240. Program routine 210, which in this example is an application program, generates a Request. Arrow 601 illustrates the program routine 210 storing contextual information on the Request in queue 650. Arrow 604 illustrates program routine 210 forwarding the Request through FPI 220 to first family 320a, which is an instance of family 320. Arrow 606 illustrates family 320a storing contextual information in queue 651 to "remember" the Request. Arrow 609 illustrates the Request flowing from first family 320a, through a first PPI 340a which is an instance of PPI 340, to a first plugin 350a which is an instance of plugin 350. Arrow 611 illustrates first plugin 350a storing contextual information on the Request in queue 652.

Arrow 614 illustrates the Request flowing from first plugin 350a to second family 320b, which is also an instance of family 320. Arrow 616 illustrates family 320b storing contextual information on the Request in queue 653. Arrow 619 illustrates the Request passing through a second PPI 340b which is an instance of PPI 340, to a second plugin 350b which is an instance of plugin 350. Arrow 621 illustrates plugin 350b storing contextual information on the Request in queue 654, and arrow 624 illustrates the Request passing to target system 240.

Arrow 602 illustrates program routine 210 at this time reading contextual information on the Request to generate a non-transactional Cancel. Arrow 603 illustrates program routine 210 storing contextual information on the Cancel in queue 650, and arrow 605 illustrates program routine 210 forwarding the Cancel through FPI 220 to family 320a. Arrow 607 illustrates family 320a reading the contextual information from queue 651 to determine the whereabouts of the Request, and arrow 608 illustrates family 320a storing contextual information on the Cancel in queue 651. Based on the contextual information read, the Cancel proceeds as illustrated by arrow 610 through PPI 340a to first plugin 350a. Arrow 612 illustrates plugin 350a reading contextual information on the Request, and arrow 613 illustrates plugin 350a storing contextual information on the Cancel in queue 652.

Arrow 615 illustrates plugin 350a forwarding the Cancel to second family 320b based on the contextual information on the Request retrieved from queue 652. Arrow 617 illustrates family 320b reading contextual information on the Request from queue 653, and arrow 618 illustrates family 320b storing contextual information on the Cancel in queue 653. Based on the retrieved contextual information, family 320b as illustrated by arrow 620 forwards the Request through PPI 340b to plugin 350b. Arrow 622 illustrates plugin 350b reading contextual information on the Request from queue 654, and arrow 623 illustrates plugin 350b storing contextual information on the Cancel in queue 654. Based on the retrieved contextual information, plugin 350b as illustrated by arrow 625 attempts to pass the Cancel to target system 240.

In this example, target system 240 supports cancellation, and thus target system 240 terminates its operations and discards the intermediate results. Arrow 626 illustrates a "canceled" Request status response being forwarded to plugin 350b, which accordingly deletes from queue 654 the contextual information on the Request and the contextual information on the Cancel. Arrows 627 and 628 illustrate a "Request Canceled" response and a "Cancel Succeeds" response passing through PPI 340b to family 320b, which accordingly deletes the appropriate contextual information from queue 653. Arrows 629–634 illustrate the Request and Cancel responses similarly flowing through layers 250 back to program routine 210, while each layer 250 accordingly deletes the appropriate contextual information on the Request and on the Cancel respectively. Upon receipt of the responses, program routine 210 deletes its contextual information on the Request and on the Cancel from queue 650. Further, as each layer 250 and routine 210 receive the Request response, the layer and routine send a Cancel Chase to each "lower" layer 250.

Although the Cancel is described as propagating through the layers 250, the Cancel is actually propagating in administrative system 360 and searching each layer 250 for the Request.

The foregoing description is by way of example only, and other variations of the above-described embodiments and methods are provided by the present invention. For example, although the present invention has been described with reference to families, any asynchronous system having a predetermined hierarchy can alternatively be used. Components of this invention may be implemented using a programmed general purpose digital computer, using application specific integrated circuits, or using a network of interconnected conventional components and circuits. The embodiments described herein are presented for purposes of illustration and are not intended to be exhaustive or limiting. Many variations and modifications are possible in light of the foregoing teaching. The system is limited only by the following claims.

What is claimed is:

1. A method for an operating system in a computer to cancel a System Request which has been issued from a location in an originating program for propagating along a path through locations in a cancellation system having at least one intermediate layer including at least one Family Program Interface for a family of a Family Server to a location in a target system, comprising the steps of:

maintaining first contextual information related to the Request in a context data structure of the originating program, the Family Program Interface adding identification information to the first contextual information as a result of the issuance of the Request;

maintaining second contextual information related to the Request in a shared context data structure associated with the at least one intermediate layer, the family adding contextual information about the Request to the second contextual information; and generating a Cancel to cancel the Request, sending the Cancel via the Family Program Interface to an administrative system of the Family Server, chasing the Request through the at least one layer via the administrative system and taking actions based on the location of the Request when the Cancel catches up to the Request, wherein if the Cancel reaches Request before the Request reaches the target system, the context information about the request is cancelled from the second context information, a status response on the Request and a status response on the Cancel are generated and sent back along the path toward the originating program, and as each status response reaches a layer contextual information on the request and on the Cancel is deleted from the second context information; and wherein the at least one intermediate layer updates the shared context data structure as the Request and the Cancel propagate through the at least one intermediate layer.

2. The method of claim 1 further comprising, after the step of generating the Cancel, the step of canceling the Request at the cancellation system if the Request has not been forwarded to the target system.

3. The method of claim 1 wherein the first contextual information is for use when results of the completed Request are returned to the originating program before the Cancel reaches the Request.

4. The method of claim 1 wherein the Request is associated with original Request identification information which identifies the Request, and the first contextual information includes the original Request identification information.

5. The method of claim 4 wherein the original Request identification information is selected from a group consisting of a connection ID which identifies the connection over which the Request is to pass and a task ID which specifies tasks to be performed.

6. The method of claim 1 wherein an administrative system simultaneously processes a plurality of said Cancels.

7. The method of claim 1 wherein the shared context data structure provides the location of the Request.

8. A method for canceling a System Request in a computer system having memory, comprising the steps of:

providing an originating program routine, associated with a first context data structure, and a target system, coupled together by at least one intermediate layer including at least one Family Program Interface for a family of a Family Server, the at least one intermediate layer being associated with a second context data structure;

using the originating program routine to generate the Request;

storing identification information on the Request via the family in the second context data structure;

delivering the Request to the at least one intermediate layer;

generating a Cancel including the identification information identifying the Request, and sending the Cancel via the Family Program Interface to an administrative system of the Family Server;

storing Cancel information about the Request in the second context data structure; and forwarding the Cancel via the administrative system to at least one intermediate layer to chase and overtake the Request.

9. The method of claim 8 wherein the at least one intermediate layer updates the second context data structure as the Request and the Cancel propagate through the at least one intermediate layer.

10. The method of claim 8 wherein the identification information includes a Request ID identifying the particular Request.

11. The method of claim 10 wherein the Request ID is selected from a group consisting of a connection ID specifying the connection over which the Request is to pass and a task ID which specifies tasks to be performed.

12. The method of claim 10 further comprising, after forwarding the Cancel, the step of deleting the Request from the memory.

13. The method of claim 10 further comprising:

after delivering the Request, the step of forwarding the Request to the target system; and after forwarding the Cancel, the step of terminating operations of the target system if such terminating is feasible.

14. The method of claim 9 further comprising, after the step of forwarding the Cancel, the step of generating a response to the Request and a response to the Cancel, wherein one of said response to the Request and of said response to the Cancel permits modifying information in the intermediate layer.

15. A computer data storage medium storing a program for causing a computer to perform the steps of:
- issuing a System Request for service to be sent along a path including at least one intermediate layer having at least one Family Program Interface for a family of a Family Server, and performed by a target system;
- maintaining identification information on the Request via said family, in a shared context data structure within said at least one intermediate layer;
- generating a Cancel including the identification information on the Request;
- sending the Cancel via the Family Program Interface to an administrative system of the Family Server, based on the identification information to overtake via the administrative system and if possible cancel the Request; and
- taking actions based on where the Request is located when the Cancel reaches the Request, and if the Cancel reaches the Request before the Request reaches the target system, context information about the request is cancelled from the shared context, a status response on the Request and a status response on the Cancel is generated and sent back along the path toward the originating program, as each status response reaches a layer contextual information on the request and on the Cancel is deleted from the shared context.

16. A system for canceling a System Request which has been issued from an originating program for propagating along a path through locations in a cancellation system having at least one intermediate layer including at least one Family Program Interface for a family of a Family Server to a target system, comprising:
- means for maintaining first contextual information related to the Request in a context data structure associated with the originating program, the Family Program Interface adding identification information to the first contextual information as a result of the issuance of the Request;
- means for maintaining second contextual information related to the Request in a shared context data structure associated with the at least one intermediate layer, the family adding contextual information about the Request to the second contextual information; and
- means for generating a Cancel, sending the Cancel via the Family Program Interface to an administrative system of the Family Server, and chasing the Request through the at least one layer via the administrative system to cancel the Request and take actions based on the location of the Request when the Cancel catches up to the Request,
- wherein if the Cancel reaches Request before the Request reaches the target system, the context information about the request is cancelled from the second context information, a status response on the Request and a status Response on the Cancel are generated and sent back along the path toward the originating program, and as each status response reaches a layer contextual information on the request and on the Cancel is deleted from the second context information; and
- wherein the at least one intermediate layer updates the shared context data structure as the Request and the Cancel propagate through the at least one intermediate layer.

17. The system of claim 16, wherein the first contextual information is for use when results of a completed Request are returned to the originating program before the Cancel overtakes the Request.

18. The system of claim 16 wherein the means for generating includes means for receiving a Cancel message from a user.

19. The system of claim 16 wherein the Request is associated with Request identification information which identifies the Request, and the first contextual information includes the Request identification information.

20. The system of claim 19 wherein the Request identification information is selected from a group consisting of a connection ID which identifies the connection over which the Request is to pass and a task ID which specifies tasks to be performed.

21. The method of claim 2, if the Request has been forwarded to the target system, further comprising the steps of:
- maintaining canceling information in the shared context data structures; and
- forwarding the Cancel to the target system.

22. The method of claim 21 further comprising the step of canceling operations associated with the Request if the target system supports such canceling; otherwise allowing the operations to be finished.

23. The method of claim 22 wherein the sending of the status response on the Request and of the status response on the Cancel is in response to the originating program.

24. The method of claim 4 wherein the second contextual information includes new Request identification information associated with the original Request identification information.

25. The method of claim 5 wherein the connection ID and the task ID are useful in a synchronous Request.

26. The method of claim 7 wherein the shared context data structure, if the Cancel reaches the at least one layer ahead of the Request, enables canceling the Request when the Request arrives at the at least one layer.

27. The method of claim 1 further comprising the step of generating a Cancel Chase if a first intermediate layer forwards a Cancel to a second intermediate layer at the same time the second layer forwards results of a completed Request to the first intermediate layer.

28. The method of claim 8 wherein the method for canceling is a method for an operating system to cancel.

29. The computer data storage medium of claim 15 storing an operating system which includes the program.

30. The system of claim 16 wherein the system is included in an operating system.

* * * * *